(12) United States Patent
Bregman et al.

(10) Patent No.: US 11,915,007 B2
(45) Date of Patent: Feb. 27, 2024

(54) CI/CD PIPELINE TO CONTAINER CONVERSION

(71) Applicant: Red Hat, Inc., Raleigh, NC (US)

(72) Inventors: Arie Bregman, Gan Yavne (IL); Ilan Gersht, Bat Yam (IL)

(73) Assignee: Red Hat, Inc., Raleigh, NC (US)

( * ) Notice: Subject to any disclaimer, the term of this patent is extended or adjusted under 35 U.S.C. 154(b) by 252 days.

(21) Appl. No.: 17/341,585

(22) Filed: Jun. 8, 2021

(65) Prior Publication Data

US 2022/0391215 A1 Dec. 8, 2022

(51) Int. Cl.
| | |
|---|---|
| G06F 8/61 | (2018.01) |
| G06F 9/38 | (2018.01) |
| G06F 9/30 | (2018.01) |
| G06F 9/455 | (2018.01) |
| G06F 8/76 | (2018.01) |

(52) U.S. Cl.
CPC .............. *G06F 9/3869* (2013.01); *G06F 8/63* (2013.01); *G06F 8/76* (2013.01); *G06F 9/30181* (2013.01); *G06F 9/3879* (2013.01); *G06F 9/45558* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 10,120,670 B1 * | 11/2018 | Atkinson | G06F 8/71 |
| 10,218,809 B2 | 2/2019 | Bradshaw et al. | |
| 10,275,231 B1 | 4/2019 | Atkinson et al. | |
| 10,877,739 B1 * | 12/2020 | Fernandez | G06F 9/455 |
| 11,144,289 B1 * | 10/2021 | Hwang | G06F 8/72 |
| 2020/0202006 A1 * | 6/2020 | Shah | G06F 8/433 |
| 2020/0272427 A1 * | 8/2020 | Wang | G06F 8/63 |
| 2022/0334830 A1 * | 10/2022 | Lele | G06F 8/60 |

FOREIGN PATENT DOCUMENTS

CN 111897551 A1 11/2020

OTHER PUBLICATIONS

Keating, Joseph and Gibson, Charles, AWS Open Source Blog, "Multi-Environment CI/CD Pipelines with AWS Code Pipeline and Open Source Tools", https://aws.amazon.com/blogs/opensource/multi-environment-ci-cd-pipelines-with-aws-codepipeline-and-open-source-tools/, Sep. 28, 2020, 31 pages.

Henry, David, "How to Handle Continuous Deployment Across Multiple Environments", https://www.dragonspears.com/blog/how-to-handle-continuous-deployment-across-multiple-environments, Jan. 30, 2019, 8 pages.

Gitlab, "Environments and Deployments", https://docs.gitlab.com/ee/ci/environments/, 2021, 25 pages.

(Continued)

*Primary Examiner* — Marina Lee
(74) *Attorney, Agent, or Firm* — Lowenstein Sandler LLP

(57) ABSTRACT

A method includes receiving, by a processing device, a definition of a CI/CD pipeline for executing a set of stages of the CI/CD pipeline. The CI/CD pipeline is associated with a first computer system. The method further includes converting, by the processing device, the definition into a container image file, and causing, by the processing device using the container image file, a second computer system to implement a container executing the CI/CD pipeline.

19 Claims, 5 Drawing Sheets

(56) References Cited

OTHER PUBLICATIONS

Anuraag, Jain, "Multi Environment Deployment with CI/CD", https://medium.com/swlh/multi-environment-deployment-with-ci-cd-44dd2187cc86, Aug. 14, 2019, 6 pages.
Papanikolopoulou, Eleni, "Integrating CI/CD for Multiple Environments with Jenkins & Fastlane (Part 1/2)", https://medium.com/@elenipapanikolo/integrating-ci-cd-for-multiple-environments-with-jenkins-fastlane-part-1-2-6e12b1ea5578, Sep. 19, 2020, 11 pages.
Redhat, "What is CI/CD?", https://www.redhat.com/en/topics/devops/what-is-ci-cd, [retrieved from the internet: Jun. 8, 2021], 10 pages.

* cited by examiner

CI/CD PIPELINE TO CONTAINER CONVERSION

TECHNICAL FIELD

The present disclosure is generally related to computer systems, and more particularly, to continuous integration and continuous delivery/deployment (CI/CD) pipeline to container conversion.

BACKGROUND

Platform-as-a-Service (PaaS) system offerings can include software and/or hardware facilities for facilitating the execution of web applications in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) and/or containers hosted on its computer hardware available to customers for this purpose. A container is a "lightweight" execution environment having relaxed isolation properties (as compared to VMs) for sharing an Operating System (OS) among applications. Similar to a VM, a container can have its own filesystem, share of CPU, memory, process space, etc. A container for an application can be packaged, together with libraries and dependencies and decoupled from the underlying infrastructure, making the container portable (e.g., portable across clouds and OS distributions). The cloud provider can provide an interface that a user can use to requisition VMs and/or containers and associated resources such as security policies, processors, storage, and network services, etc., as well as an interface to install and execute the user's applications and files. PaaS system offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
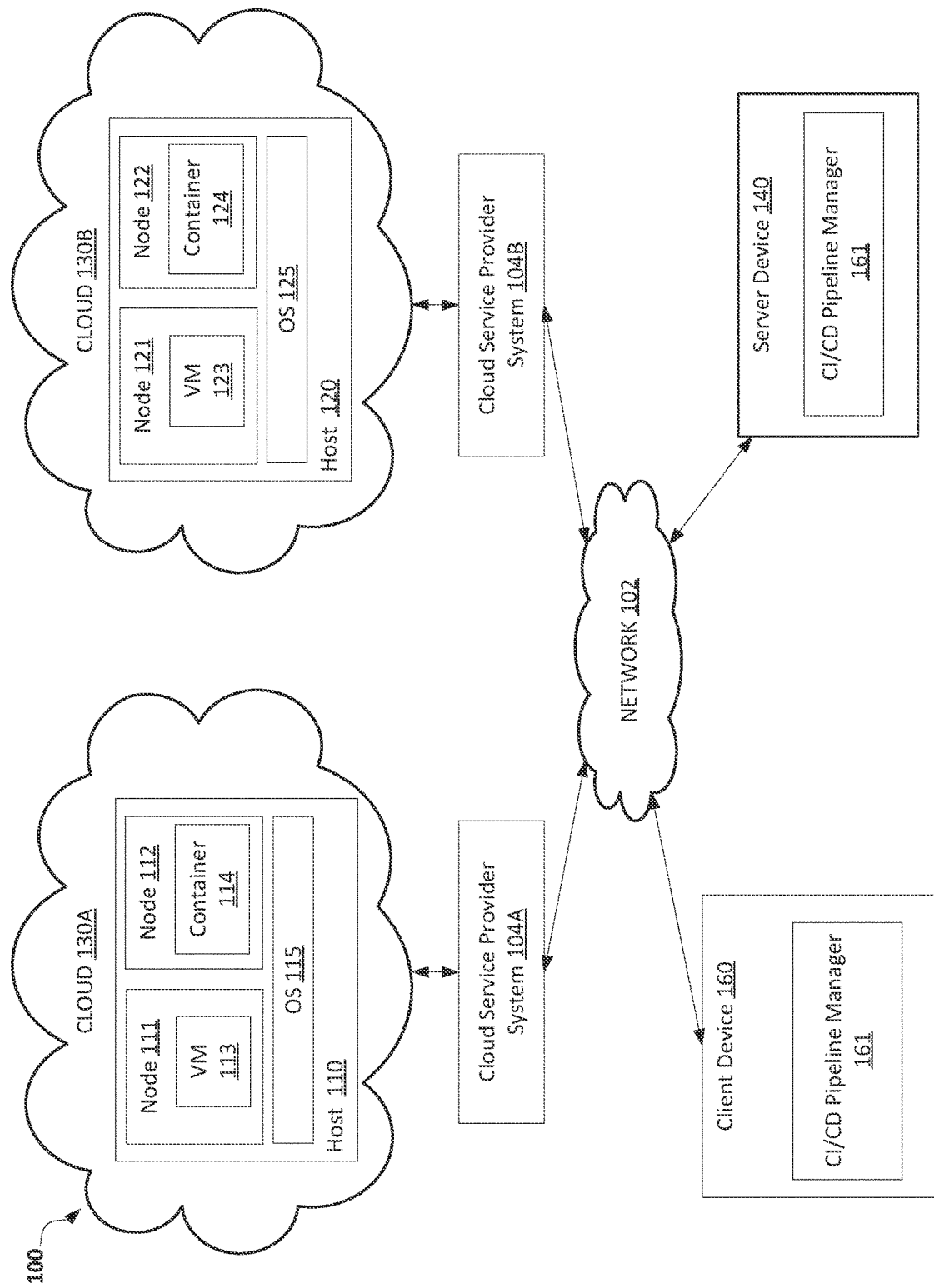
FIG. 1 depicts a high-level component diagram of an example computer system architecture, in accordance with one or more aspects of the present disclosure.

Described herein are methods and systems for continuous integration and continuous delivery/deployment (CI/CD) pipeline to container conversion. CI/CD is a method to frequently deliver applications to customers by introducing automation into the stages of software (e.g., application) development. The main concepts attributed to CI/CD are continuous integration, continuous delivery, and continuous deployment. CI/CD is a solution to the problems integrating new code can cause for development and operations teams. CI/CD introduces ongoing automation and continuous monitoring throughout the software lifecycle, from integration and testing phases to delivery and deployment. Taken together, these connected practices are often referred to as a "CI/CD pipeline" and are supported by development and operations ("DevOps") teams working together in an agile way with either a DevOps or Site Reliability Engineering (SRE) approach.

Continuous integration (CI) generally refers to an automation process for developers. Successful CI means new code changes can be regularly built, tested, and merged to a shared repository. CI provides a solution to the problem of having too many potentially conflicting branches of an application in development. The "CD" in CI/CD stands for continuous delivery and/or continuous deployment, which are related concepts that sometimes get used interchangeably. Both continuous delivery and continuous deployment generally refer to automating further stages of the CI/CD pipeline.

For example, continuous delivery generally means that a developer's software changes are automatically bug tested and uploaded to a repository, where they can then be deployed to a live production environment by the operations team. Continuous delivery provides a solution to the problem of poor visibility and communication between developer and business teams. To that end, the purpose of continuous delivery is to ensure that it takes minimal effort to deploy new code.

Continuous deployment can refer to automatically releasing a developer's changes from the repository to production, where it is usable by customers. Continuous deployment addresses the problem of overloading operations teams with manual processes that slow down delivery, and builds on the benefits of continuous delivery by automating the next stage in the CI/CD pipeline.

A CI/CD pipeline is a workflow that defines a series of steps to automatically perform the integration, delivery and deployment described above. For example, the series of steps can include a sequence of commands, conditional and/or unconditional execution control transfers, etc. The series of steps can be grouped into pipeline stages ("stages"), where each stage performs a set of tasks or jobs. Tasks can be executed by agents, and multiple tasks in a given stage can be executed in parallel based on the number of available agents. If every task in the given stage succeeds, the CI/CD pipeline transitions into the next stage. If a task in the given stage fails, then the CI/CD pipeline can prematurely terminate (in some cases, the CI/CD pipeline can move to the next stage).

Examples of pipeline stages include a build stage, a test stage, a release stage, and a deploy stage. The build stage can include a compile task that compiles software (e.g., application) to obtain a build. The test stage can include one or more testing tasks that perform one or more automated tests on the build to ensure that the build is ready for release and deployment. After the test stage, the release stage can include a release task to automatically deliver the build to a repository. The deploy stage can include a deploy task to automatically deploy the build into production.

Although CI/CD pipelines can be used for a variety of tasks, such as deployment, configuration, compiling, testing, etc., it can be desirable to run useful processes that are automated with CI/CD pipelines on a different system environment (e.g., server) from the CI/CD system (e.g., a remote system). However, the ability to "mobilize" a CI/CD pipeline and run its automation anywhere can be very limited. Usually, such mobility can be achieved when the CI/CD pipeline is itself executing an automation tool (e.g., Ansible). Then, a user can use the same automation tool in the user's own environment. However, in many cases, it can be a complex task to execute native CI/CD pipeline code "as-is" in another system environment.

Aspects of the present disclosure address the above noted and other deficiencies by implementing CI/CD pipeline to container conversion. The systems and methods described herein convert CI/CD pipeline code for executing a set of stages of a CI/CD pipeline within a CI/CD system into a container image file, which can then run on a host of a container system. The container system can be disconnected from the CI/CD system. A container image file is a lightweight, standalone, executable package of software that includes components needed to run an application. Examples of such features include, but are not limited to, code, runtime, system tools, system libraries and settings. A container can be initiated from the container image file at runtime. For example, code from the CI/CD pipeline can be obtained to generate the container image file that will run the code as an application on any host that supports the running of the container. Upon creation of the container from the container image file, the CI/CD pipeline program that has been created to run as part of the container can start running and can execute the set of stages of the CI/CD pipeline and tasks. Once the tasks are complete, the container can automatically terminate.

Thus, the systems and methods described herein can enable the development of the CI/CD pipeline in the CI/CD system and sharing of the CI/CD pipeline to other system environments without having to set up a system that can run the CI/CD pipeline. That is, the systems and methods described herein can contribute to CI/CD portability by mirroring the functionality of the CI/CD pipeline with a container mechanism.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as Red Hat® OpenShift®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes one or more cloud-computing environment 130A, 130B (also referred to herein as a cloud(s)) that includes nodes 111, 112, 121, 122 to execute applications and/or processes associated with the applications. A "node" providing computing functionality may provide the execution environment for an application of the PaaS system. In some implementations, the "node" may include a virtual machine (VMs 113, 123) that is hosted on a physical machine, such as host 110, 120 implemented as part of the clouds 130A, 130B. For example, nodes 111 and 112 are hosted on physical machine of host 110 in cloud 130A provided by cloud provider 104A. Similarly, nodes 121 and 122 are hosted on physical machine of host 120 in cloud 130B provided by cloud provider 104B. In some implementations, nodes 111, 112, 121, and 122 may additionally or alternatively include a group of VMs, a container (e.g., container 114, 124), or a group of containers to execute functionality of the PaaS applications. When nodes 111, 112, 121, 122 are implemented as VMs, they may be executed by operating systems (OSs) 115, 125 on each host machine 110, 120. It should be noted, that while two cloud providers systems have been depicted in FIG. 1, in some implementations more or fewer cloud service provider systems 104 (and corresponding clouds 130) may be present.

In some implementations, the host machines 110, 120 can be located in data centers. Users can interact with applications executing on the cloud-based nodes 111, 112, 121, 122 using client computer systems (not pictured), via corresponding client software (not pictured). Client software may include an application such as a web browser. In other implementations, the applications may be hosted directly on hosts 110, 120 without the use of VMs (e.g., a "bare metal" implementation), and in such an implementation, the hosts themselves are referred to as "nodes".

In various implementations, developers, owners, and/or system administrators of the applications may maintain applications executing in clouds 130A, 130B by providing software development services, system administration services, or other related types of configuration services for associated nodes in clouds 130A, 130B. This can be accomplished by accessing clouds 130A, 130B using an application programmer interface (API) within the applicable cloud service provider system 104A, 104B. In some implementations, a developer, owner, or system administrator may access the cloud service provider system 104A, 104B from a client device (e.g., client device 160) that includes dedicated software to interact with various cloud components. Additionally, or alternatively, the cloud service provider system 104A, 104B may be accessed using a web-based or cloud-based application that executes on a separate computing device (e.g., server device 140) that communicates with client device 160 via network 102.

Client device 160 is connected to hosts 110 in cloud 130A and host 120 in cloud 130B and the cloud service provider systems 104A, 104B via a network 102, which may be a private network (e.g., a local area network (LAN), a wide area network (WAN), intranet, or other similar private networks) or a public network (e.g., the Internet). Each client 160 may be a mobile device, a PDA, a laptop, a desktop computer, a tablet computing device, a server device, or any other computing device. Each host 110, 120 may be a server computer system, a desktop computer or any other computing device. The cloud service provider systems 104A, 104B may include one or more machines such as server computers, desktop computers, etc. Similarly, server device 140 may include one or more machines such as server computers, desktop computers, etc.

In some implementations, the client device 160 may include a CI/CD pipeline manager 161. The CI/CD pipeline manager 161 can convert CI/CD pipeline code into a container image file. More specifically, the CI/CD pipeline code can execute a set of stages of a CI/CD pipeline within a CI/CD system. The CI/CD pipeline manager 161 can modify the CI/CD pipeline code (e.g., by expanding the pipeline code and removing extraneous portions of the code), and generate the container image file from the modified pipeline code. Upon creation of the container from the container image file, the container can start running and to execute the set of stages of the CI/CD pipeline as part of an application within a container system (e.g., on a host that supports the running of the container). Once the tasks are complete, the container can be automatically terminated. The container system can lack a connection to the CI/CD system (i.e., a remote system). Further details regarding the functionality of the CI/CD pipeline manager 161 are described below with reference to FIGS. 2-4.

CI/CD pipeline manager 161 may be an application that executes entirely on client device 160. In other implementations, CI/CD pipeline manager 161 may function in whole or in part on server device 140. In such instances, CI/CD pipeline manager 161 can function as a web-based or cloud-based application that is accessible to the user via a web browser or thin-client user interface that executes on client device 160. In some implementations, a portion of CI/CD pipeline manager 161 may execute on client device 160 and another portion of CI/CD pipeline manager 161 may execute on server device 140. While aspects of the present disclosure describe CI/CD pipeline manager 161 as implemented in a PaaS environment, it should be noted that in other implementations, CI/CD pipeline manager 161 can also be implemented in an Infrastructure-as-a-Service (Iaas) environment associated with a containerized computing services platform, such as Red Hat® OpenStack®. The functionality of CI/CD pipeline manager 161 to convert a CI/CD pipeline into a container image file for implementing a container will now be described in further detail below with respect to FIGS. 2-4.

Figure 2:
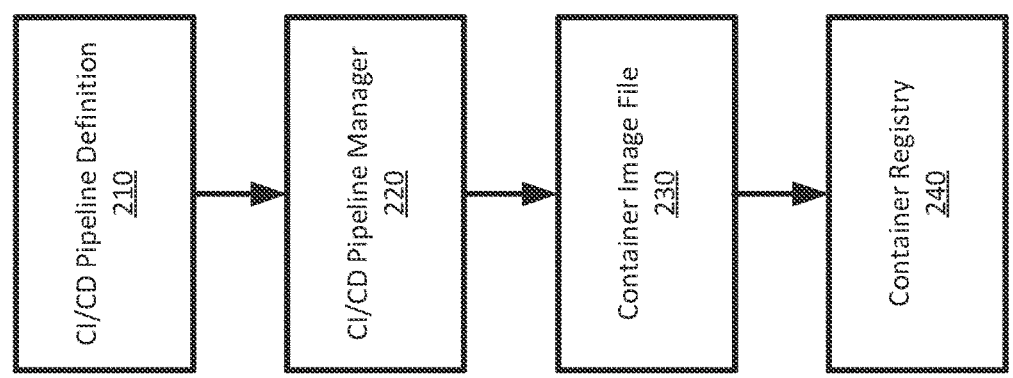
FIG. 2 depicts a block/flow diagram of a system for implementing CI/CD pipeline to container conversion, in accordance with one or more aspects of the present disclosure.

FIG. 2 depicts a block diagram illustrating a system 200 for implementing CI/CD pipeline to container conversion, in accordance with one or more aspects of the present disclosure. As shown, a CI/CD pipeline definition 210 is received by a CI/CD pipeline manager 220. The CI/CD pipeline manager 220 can be similar to or same as the CI/CD pipeline manager 161 of FIG. 1. The CI/CD pipeline 210 definition can include code that defines a set of stages, with each stage of the set of stage implementing a set of tasks within a CI/CD system. The set of tasks can include one or more tasks. The CI/CD pipeline manager 220 can convert the CI/CD pipeline definition 210 into a container image file 230 for implementing a container within a container system. The container image file 230 is a lightweight, standalone, executable package of software that includes features needed to run an application. Examples of such features include code, runtime, system tools, system libraries and settings. The container image file 230 can be used to generate a container at runtime. The container system can be a system that does not have a connection to the CI/CD system (i.e., a remote system). That is, the container can run on the container system without any connection to the CI/CD system.

The container image file 230 can then be maintained (e.g., stored) in a container registry 240. The container registry 240 includes one or more repositories for maintaining container images. The container registry 240 essentially acts as a place to store the container image file 230 and share the container image file 230 out via a process of uploading to (e.g., pushing) and downloading from (e.g., pulling). The container registry 240 can maintain other information, including application programming interface (API) paths, access control parameters, etc. Once the container image file 230 is on another system, the application contained within the container image file 230 can be run on that system as well. In some embodiments, the container registry 240 is a public container registry. In some embodiments, the container registry 240 is a private container registry that provides cybersecurity and privacy functionality (e.g., container image authentication, security scanning, patching, access control). Further details regarding implementing CI/CD pipeline to container conversion will now be described below with reference to FIGS. 3-4.

Figure 3:
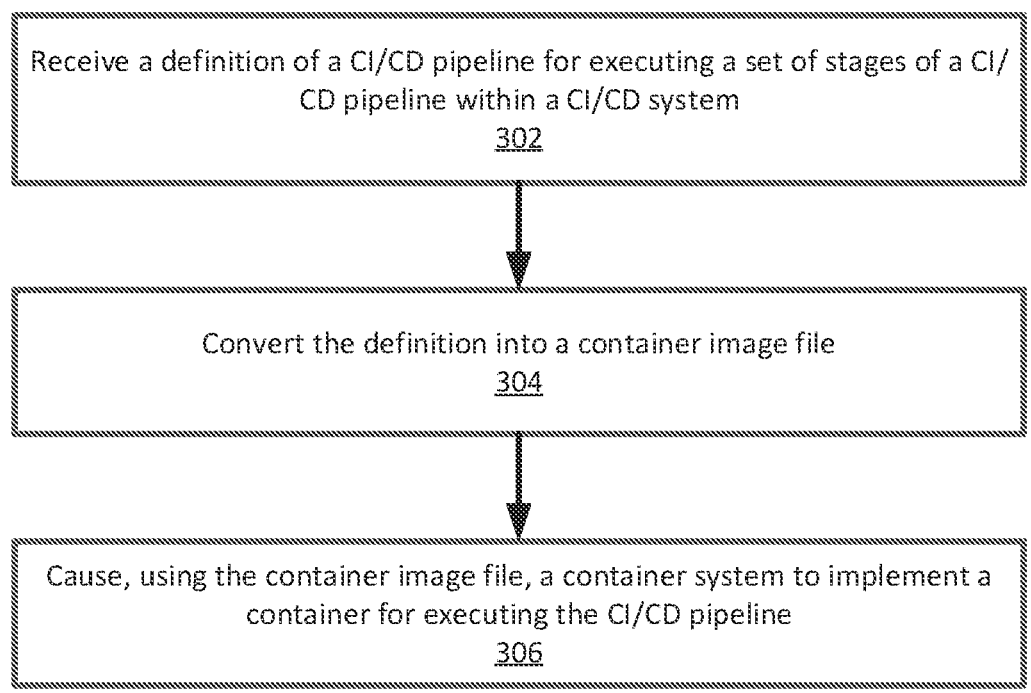
FIG. 3 depicts a flow diagram of a method for implementing CI/CD pipeline to container conversion, in accordance with one or more aspects of the present disclosure.

FIG. 3 depicts a flow diagram of an example method 300 for implementing CI/CD pipeline to container conversion, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 300 may be performed by a CI/CD manager, such as the CI/CD manager 161 in FIG. 1. Alternatively, some or all of method 300 might be performed by another module or machine. It should be noted that blocks depicted in FIG. 3 could be performed simultaneously or in a different order than that depicted.

At block 302, the processing logic receives a definition of a CI/CD pipeline for executing a set of stages of a CI/CD pipeline within a CI/CD system. Each stage of the set of stages can execute a set of tasks. Each task of the set of tasks can include one or more tasks.

At block 304, the processing logic converts the definition into a container image file. More specifically, code content of the definition is converted into something that can be executed every time the container image file is run. In some embodiments, the processing logic converts the entire definition into the container image file. In some embodiments, one or more portions of the definition can be included and/or excluded from being converted into the container image file. Further details regarding converting a CI/CD pipeline into a container image file at block 304 will be described below with reference to FIG. 4.

At block 306, the processing logic causes, using the container image file, a second computer system to implement a container for executing the CI/CD pipeline. The container system can be a system that does not have a connection to the CI/CD system. That is, the container can run on the container system without any connection to the CI/CD system. Execution of the CI/CD pipeline implementing the container can be initiated with a start or run command, execution of the CI/CD pipeline implementing the container can be paused using a pause command, and execution of the CI/CD pipeline implementing the container can be manually terminated using a stop command. In response to detecting a failure or error during execution, the container can be configured to automatically stop, and require manual restart by default. However, a restart policy can be implemented to automatically restart the container after detecting the failure or error.

Unlike virtual machines that will continue running until they are instructed to stop, containers will automatically self-terminate. As such, the container can require commands to keep the container running. If there are no more commands to execute, the container is shutdown. The container can be restarted after it is terminated. For example, the container can be restarted manually, or a restart policy can be set up to automatically restart the container.

Figure 4:
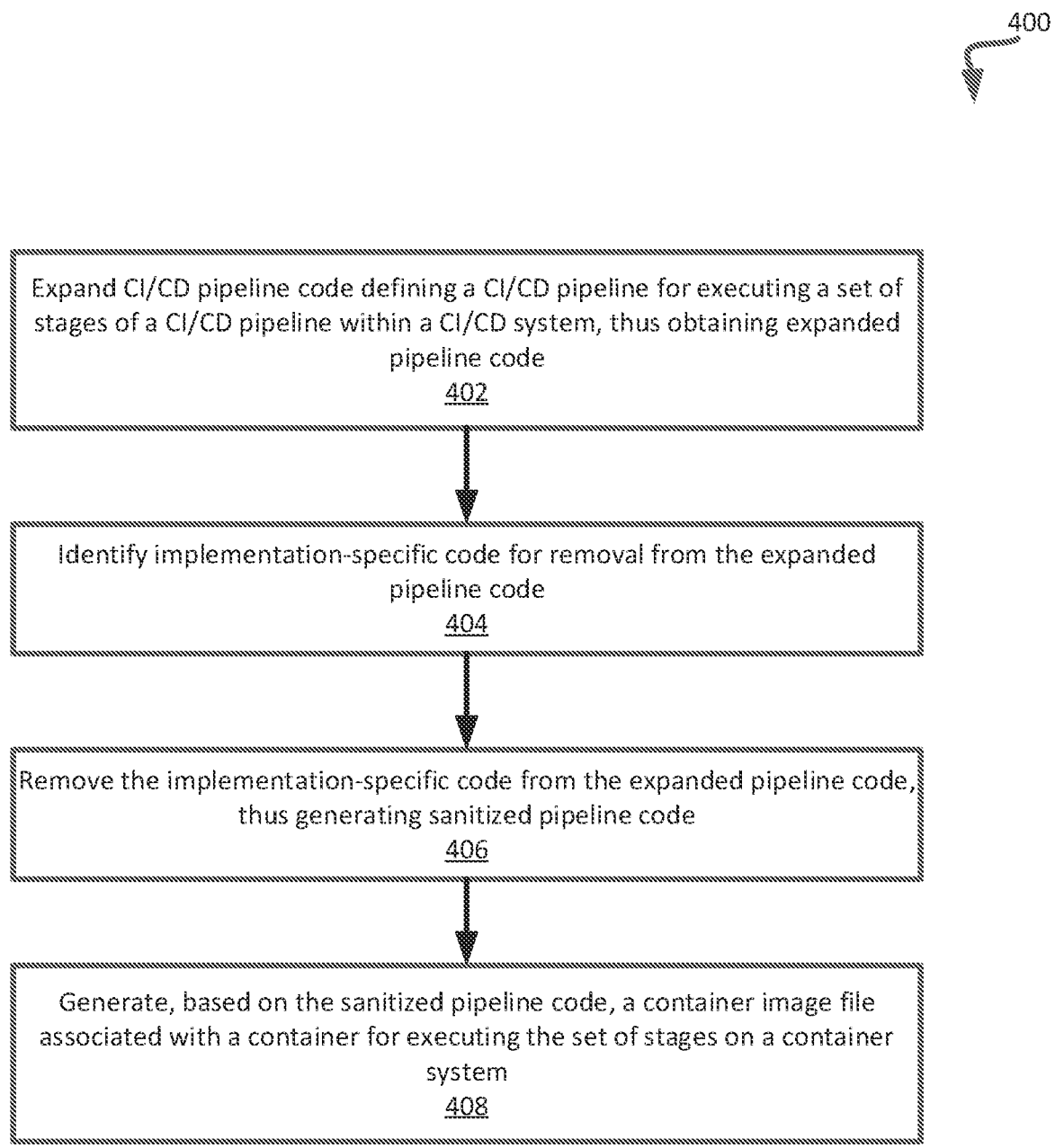
FIG. 4 depicts a flow diagram of a method for converting a CI/CD pipeline into a container, in accordance with one or more aspects of the present disclosure.

FIG. 4 depicts a flow diagram of an example method 400 for converting a CI/CD pipeline into a container, in accordance with one or more aspects of the present disclosure.

The method may be performed by processing logic that may comprise hardware (circuitry, dedicated logic, etc.), computer readable instructions (run on a general purpose computer system or a dedicated machine), or a combination of both. In an illustrative example, method 400 may be performed by a CI/CD manager, such as the CI/CD manager 161 in FIG. 1. Alternatively, some or all of method 400 might be performed by another module or machine. It should be noted that blocks depicted in FIG. 4 could be performed simultaneously or in a different order than that depicted.

At block 402, the processing logic expands CI/CD pipeline code of a CI/CD pipeline definition for executing a set of stages of a CI/CD pipeline within a CI/CD system, thus obtaining expanded pipeline code. Each stage of the set of stages performs a set of tasks. The pipeline code can include a set of methods and/or functions used by the CI/CD pipeline for executing the set of tasks. The set of functions can include functions from system libraries of the first system for use in the container when it is running.

At block 404, the processing logic identifies implementation-specific code for removal from the expanded pipeline code. The implementation-specific code can include code that is specific to the CI/CD pipeline context (e.g., specifically controls execution of the set of stages within the CI/CD system). Thus, the implementation-specific code corresponds to functionality that is unnecessary or irrelevant for container implementation of the set of stages of the CI/CD pipeline and can be removed from the expanded pipeline code during the conversion. In some embodiments, the implementation-specific code is automatically identified. For example, the expanded pipeline code can be analyzed using an appropriate driver to identify portions of code corresponding to functions specific to the CI/CD system.

The implementation-specific code can include code that is specific to CI/CD pipeline syntax. For example, the set of stages of the CI/CD pipeline correspond to logical separations of the CI/CD pipeline workflow. However, there is no notion of logical separations or stages with respect to a container image workflow, and thus CI/CD syntax that defines the set of stages within the CI/CD pipeline workflow is unnecessary and can be designated for removal. The implementation-specific code can further include code related to acquiring a host and/or releasing a host. The implementation-specific code can further include CI/CD pipeline scheduling code. Examples of CI/CD pipeline scheduling code including host scheduling code, CI/CD system archiving code, etc. In some CI/CD pipeline definitions (e.g., depending on usage and system used), a definition can be provided with respect to which node or group of nodes should execute a CI/CD pipeline. When converting the CI/CD pipeline code into a container image file, such CI/CD scheduling code is unnecessary or irrelevant because the CI/CD pipeline execution will become a container execution on a chosen host. The implementation-specific code can further include code related to archiving artifacts produced during execution of the set of stages of the CI/CD pipeline.

Identifying the implementation-specific code line-by-line for removal can be ineffective. Thus, in some embodiments, identifying the implementation-specific code for removal can include separating the expanded pipeline code into a number of code blocks. The separation can depend on the syntax of the expanded pipeline code and the programming language used to write the expanded pipeline code (e.g., Java, Groovy, YAML). Then, for each code block, it is determined whether the code block is CI/CD pipeline specific. For example, it is determined whether the code block is related to how a user has configured the CI/CD pipeline to run (i.e., non-implementation-specific), or related to how the CI/CD pipeline functions (i.e., implementation-specific).

At block 406, the processing logic removes the implementation-specific code from the expanded pipeline code, thus generating sanitized pipeline code. That is, the sanitized code includes code related to what is will be performed during execution of the CI/CD pipeline using the container. The sanitized code generally includes user-configured features, except for any user-configured features that correspond to implementation-specific code (e.g., any host acquisition specifications provided by the user). Accordingly, the expanded pipeline code is sanitized by removing code that is specific to the CI/CD pipeline mechanisms, and irrelevant with respect to running the CI/CD pipeline workflow as part of a container.

Since there are many CI/CD systems utilizing different types of programming languages, a sanitizing driver for a given programming language can be used to identify and remove the implementation-specific code from the expanded pipeline code written in the given programming language. For example, the sanitizing driver can be used to extract only the non-implementation-specific commands that can be run with the container.

At block 408, the processing logic generates, based on the sanitized pipeline code, a container image file associated with a container for executing a set of tasks on a container system. For example, the container system can be a system that does not have a connection to the CI/CD system (i.e., a remote system). More specifically, the sanitized pipeline code can be converted into container code. Since CI/CD systems can employ different environments, a driver designed for each corresponding CI/CD system can be needed to convert the sanitized pipeline code into container code (e.g., converting commands from the sanitized pipeline code into respective commands for of the container code). For example, if the sanitized pipeline code is written in a YAML format, a YAML-specific driver can be used to convert the sanitized pipeline code into the container code. Accordingly, a number of drivers can be provided that are each customized for handling the code conversion from a corresponding CI/CD system environment to a container system.

Each code block within the sanitized code can have a corresponding purpose (e.g., execution, defining variables). The code block can be translated into container code in accordance with the corresponding purpose. As an illustrative example, take the following example section of sanitized pipeline code including shell commands associated with a CI/CD system (e.g., Jenkins):

sh "''"
ls /tmp
cat /etc/some_configuration
df -h
"''"

This section of sanitized code lists contents of a temporary directory (/tmp), views "some configuration" from a configuration directory (/etc), and shows disk space statistics in a human-readable format (e.g., in bytes, megabytes, gigabytes). Although Jenkins is mentioned as an illustrative example, the embodiments described herein can be applied to any suitable CI/CD platform. This section of sanitized pipeline code can then be converted into a container-suitable format as follows:

CMD ls /tmp
CMD cat /etc/some_configuration
CMD df -h

That is, the container instruction "CMD" is placed in front of each task to define default executables of the container image file. This section of code can also be written as CMD ls /tmp && cat /etc/some_configuration && df. Additional software drivers may also be needed for less direct translations and/or for converting non-shell-commands from a definition into a container image file.

To run a CI/CD pipeline on a CI/CD system, a host or group of hosts can be acquired. For example, a user can specify which host or group of hosts are needed to run the CI/CD pipeline. Although the container will be run anywhere, one consideration that can be addressed is specifying which operating system will be used within the container image file. The decision of which operating system to use can be made based on the host or group of hosts that were acquired to run the CI/CD pipeline on the CI/CD system. Once an operating system is identified, an entrypoint within the container image file can be added based on the operating system.

Another consideration for generating the container image file is handling a situation in which a first CI/CD pipeline is connected to a second CI/CD pipeline. For example, the first CI/CD pipeline can be used to generate compiled code, and the compiled code can be passed to the second CI/CD pipeline to test the compiled code. In this case, the container image file can be generated to include content from both the first CI/CD pipeline and the second CI/CD pipeline.

Another consideration for generating the container image file is handling user inputs that may be needed to run the CI/CD pipeline. The user inputs can dictate control over how certain parts of the CI/CD pipeline are to be executed (e.g., which debugging and/or logging level should be applied). For example, in CI/CD systems like Jenkins, there can be "build parameters," which can include a set of fields for the user (or an external service/trigger) to fill in (or maintain default values) when building the software.

To handle user inputs with respect to the container image file, one or more variables can be defined within the container image file. One example of a variable is an argument variable ("ARG"). ARG defines a variable that can be passed at build-time to the builder with a build command. Another example of a variable is an environmental variable ("ENV"). Instead of passing variables at build-time with ARG, different ENV's can be defined or set on a different host, and the process will request input to continue running the container during container execution. Moreover, one or more inputs can be replaced with a fixed or default value. For example, the debugging level can always be set to "1" to eliminate the need to ask the user for a debugging level input.

Another consideration for generating the container image file is handling the outputs of the container. Since the container is implementing the CI/CD pipeline, its output can be saved in the same or similar manner as it would be in the CI/CD system. For every run of the container, the container output can be saved to a file, similar to how the container output is managed with CI/CD pipeline archives. A user can define where to store the outputs of the container. For example, the outputs of the container can be stored locally to the user, on a remote server, etc. Without a user specification, the default output storage setting can be local storage. Accordingly, the container image file can include storage location information defining at least one storage location for container outputs.

One example of output of the container are logs. For example, when the CI/CD pipeline finishes executing the set of tasks, it can archive a set of logs. While this will archive log files produced during a CI/CD pipeline build, there is no meaning for such archiving when it comes to containers. To archive the set of logs using the container deployed from the container image file, the container can save archives to a volume that is attached to the container so that the set of logs can be saved even after the set of tasks terminates and the container is deleted.

Figure 5:
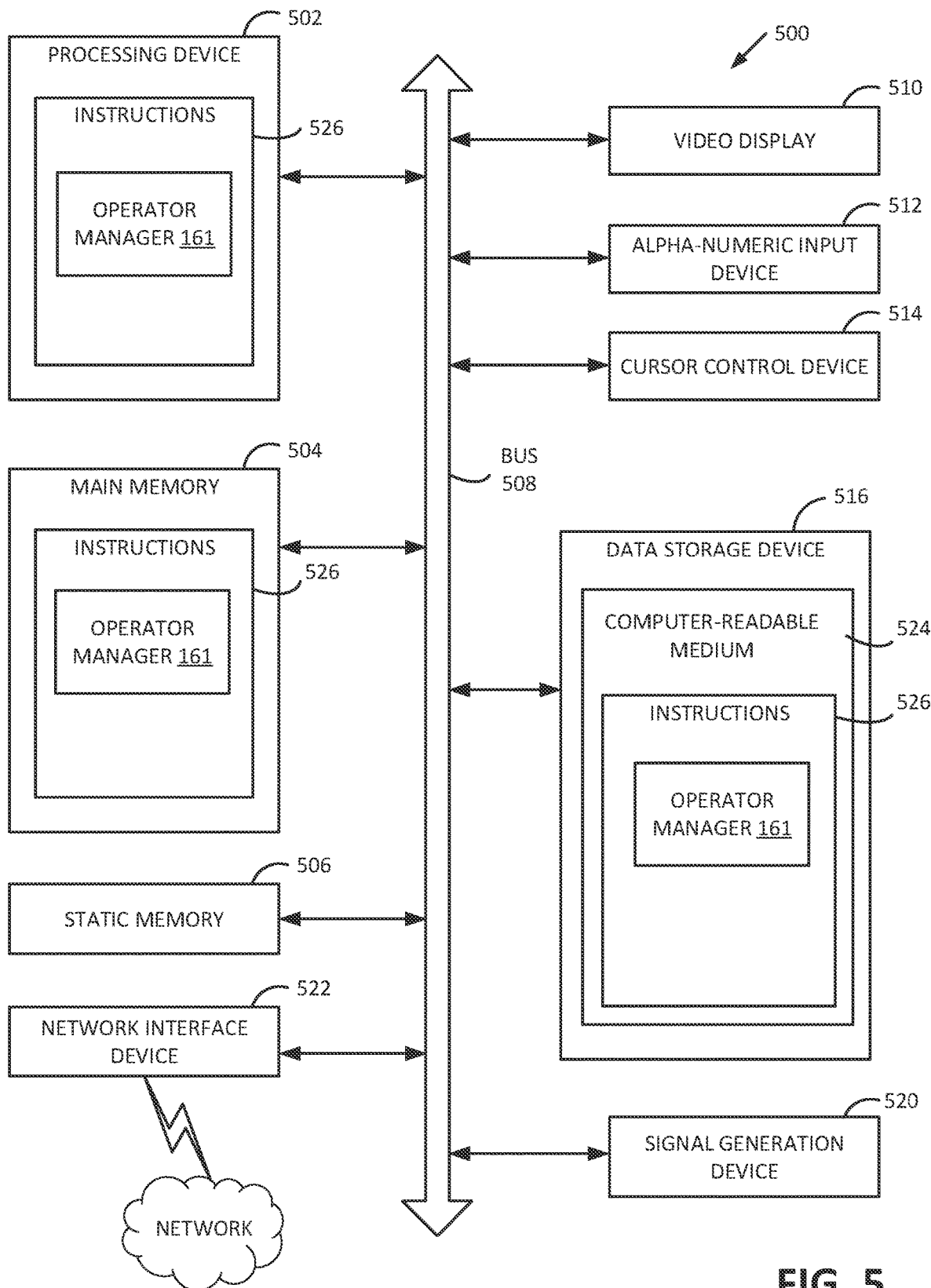
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes CI/CD pipeline manager 161 for performing the operations and steps discussed herein (e.g., corresponding to the method of FIGS. 3 and 4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include CI/CD pipeline manager 161 (e.g., corresponding to the method of FIGS. 3 and 4, etc.) embodying any one or more of the methodologies or functions described herein. CI/CD pipeline manager 161 may also reside, completely or at least partially, within the main memory 504 and/or within the processing device 502 during execution thereof by the computer system 500, the main memory 504 and the processing device 502 also constituting computer-readable media. CI/CD pipeline manager 161 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
   receiving, by a processing device, a definition of a continuous integration and continuous delivery/deployment (CI/CD) pipeline for executing a set of stages of the CI/CD pipeline, wherein the CI/CD pipeline is associated with a first computer system;
   converting, by the processing device, the definition into a container image file, wherein converting the definition into the container image file comprises removing implementation-specific code associated with the definition; and
   causing, by the processing device using the container image file, a second computer system, different from the first computer system, to implement a container executing the CI/CD pipeline.

2. The method of claim 1, wherein converting the definition into the container image file further comprises expanding code of the definition to obtain expanded pipeline code, and wherein the implementation-specific code is removed from the expanded pipeline code.

3. The method of claim 1, wherein the implementation-specific code comprises code related to logical separations associated with the set of stages.

4. The method of claim 1, wherein the implementation-specific code comprises CI/CD pipeline scheduling code.

5. The method of claim 1, wherein converting the definition into the container image file further comprises identifying an operating system for executing the container.

6. The method of claim 1, wherein converting the definition into the container image file further comprises:
defining a set of variables within the container image file for handling inputs for executing the CI/CD pipeline; and
receiving storage location information defining a storage location for handling outputs during container execution of the CI/CD pipeline.

7. The method of claim 1, wherein the first computer system is a CI/CD system, and wherein the second computer system is a host.

8. A computing system comprising:
a memory; and
a processing device, operatively coupled to the memory, to:
receive a definition of a continuous integration and continuous delivery/deployment (CI/CD) pipeline for executing a set of stages of the CI/CD pipeline, wherein the CI/CD pipeline is associated with a first computer system;
convert the definition into a container image file, wherein, to convert the definition into the container image file, the processing device is to remove implementation-specific code associated with the definition; and
cause, using the container image file, a second computer system, different from the first computer system, to implement a container for executing the CI/CD pipeline.

9. The computing system of claim 8, wherein, to convert the definition into the container image file, the processing device is further to expand code of the definition to obtain expanded pipeline code, and wherein the implementation-specific code is removed from the expanded pipeline code.

10. The computing system of claim 8, wherein the implementation-specific code comprises code related to logical separations associated with the set of stages.

11. The computing system of claim 8, wherein the implementation-specific code comprises CI/CD pipeline scheduling code.

12. The computing system of claim 8, wherein, to convert the definition into the container image file, the processing device is further to identify an operating system for executing the container.

13. The computing system of claim 8, wherein, to convert the definition into the container image file, the processing device is further to:
define a set of variables within the container image file for handling inputs for executing the CI/CD pipeline; and
receive storage location information defining a storage location for handling outputs during container execution of the CI/CD pipeline.

14. The computing system of claim 8, wherein the first computer system is a CI/CD system, and wherein the second computer system is a host.

15. A computing system comprising:
a memory; and
a processing device, operatively coupled to the memory, to:
receive a definition of a continuous integration and continuous delivery/deployment (CI/CD) pipeline for executing a set of stages of the CI/CD pipeline, wherein the CI/CD pipeline is associated with a first computer system;
expand code of the definition to obtain expanded pipeline code comprising implementation-specific code;
remove the implementation-specific code from the expanded pipeline code; and
after removing the implementation-specific code, generate a container image file for implementing a container associated with a second computer system, different from the first computer system, for executing the CI/CD pipeline.

16. The computing system of claim 15, wherein the implementation-specific code comprises at least one: of code related to logical separations associated with the set of stages, or CI/CD pipeline scheduling code.

17. The computing system of claim 15, wherein the processing device is further to cause the second computer system to implement the container for executing the CI/CD pipeline.

18. The computing system of claim 15, wherein, to generate the container image file, the processing device is further to:
identify an operating system for executing the container;
define a set of variables within the container image file for handling inputs for executing the CI/CD pipeline; and
receive storage location information defining a storage location for handling outputs during container execution of the CI/CD pipeline.

19. The computing system of claim 15, wherein the first computer system is a CI/CD system, and wherein the second computer system is a host.

* * * * *